Dec. 29, 1970   R. D. ZIMMERLY   3,551,072
VARIABLE SPEED MOTOR DRIVEN PUMPING SYSTEM
Filed Jan. 31, 1969
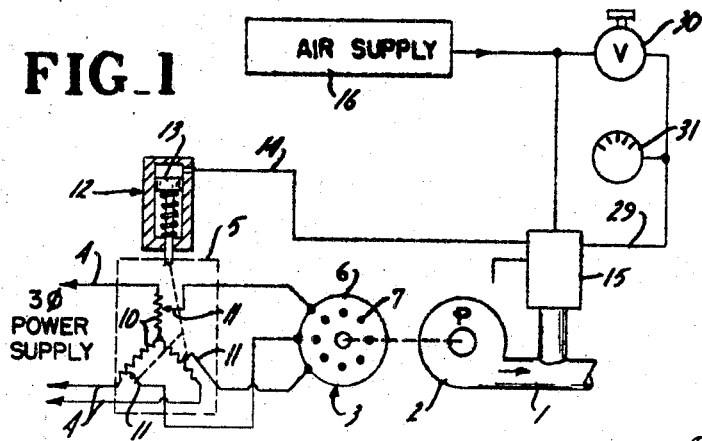
FIG_1
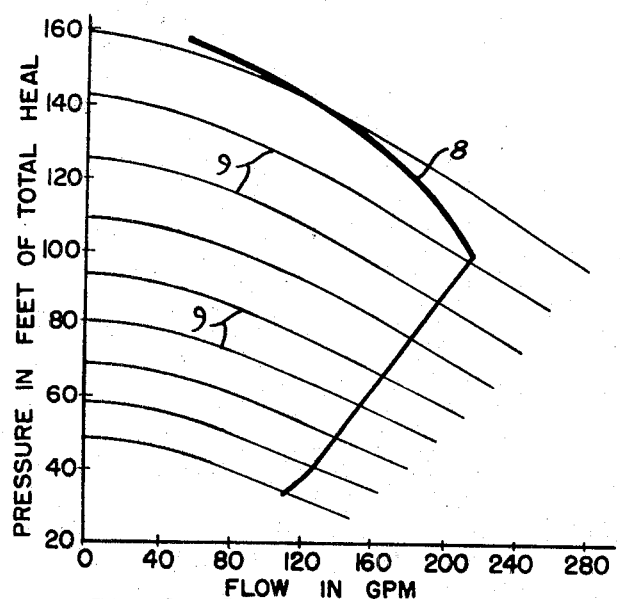
FIG_2
FIG_3
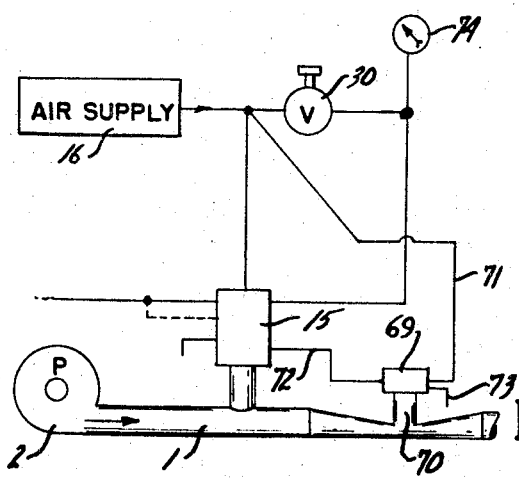
FIG_4
INVENTOR.
ROBERT D. ZIMMERLY
BY
Andrus, Sceales, Starke & Sawall
Attorneys United States Patent Office 3,551,072
Patented Dec. 29, 1970

3,551,072
VARIABLE SPEED MOTOR DRIVEN PUMPING SYSTEM
Robert D. Zimmerly, Kenosha, Wis., assignor to Ladish Co., Cudahy, Wis., a corporation of Wisconsin
Filed Jan. 31, 1969, Ser. No. 795,427
Int. Cl. F04b 15/00, 49/00
U.S. Cl. 417—45                                11 Claims

ABSTRACT OF THE DISCLOSURE

The present disclosure is directed to a pumping system having a three-phase squirrel cage motor connected to drive a centrifugal pump over a relatively wide range of varying loads and speed. A three-phase autotransformer connects the motor to a power supply. A servosystem includes an error sensor connected to the output side of the pump and connected to actuate a three-way valve for selectively supplying and exhausting air for a pneumatic actuator connected to the autotransformer. A diaphragm actuator positions the valve and a pressure feedback is provided to stabilize the operating point.

---

This invention relates to a variable speed motor driven pumping system and particularly to a liquid pumping system including a polyphase synchronous induction motor driving a centrifugal pump.

Electric motor driven pumps are widely employed for establishing selected flow of liquids through suitable conduit means for liquid processes, transfer and the like. Various direct and alternating current motors are available. Alternating current motors are of single phase or polyphase constructions. With the development of solid state controls employing controlled rectifiers and the like, special motors have been developed to provide characteristics peculiar to the wave shape of the voltage in solid state controls. Thus, a controlled rectifier varies the portion of each half cycle of the input voltage wave applied to the motor. This results in a chopped wave having a high harmonic content. Generally, in alternating current motors this results in a very substantial heating effect. Special synchronous induction motors of squirrel cage rotor design have been designed and are commercially available to permit operation with the chopped wave control. Generally, such motors are specially constructed to rapidly dissipate the heat and thereby permit operation without overheating or damaging heating. Although the special motors are generally of the open construction, a totally enclosed motor is available from Brook Manufacture Corporation of Great Britain. In certain systems which have strict sanitary requirements, it is desirable to have a totally enclosed pumping system including the motor which can be readily cleaned without special consideration being given to the wetting the motor structure and the like. Although such systems provide satisfactory control systems and drive means, solid state control systems are relatively expensive particularly where a polyphase motor is employed. A polyphase motor has, however, certain distinct advantages particularly because they can be started without special starting circuits and the like. The special high temperature motors employing solid state controls have generally been applied in applications requiring a constant pressure and variable flow. For example, high rise buildings require such flow systems and can advantageously employ solid state electronic controls because of the very absolute minimum amount of maintenance associated with such systems. Thus, the particular application justifies the substantial cost associated with solid state electronic controls.

The present invention is particularly directed to a system for driving a centrifugal pump or the like with a synchronous motor over a relatively wide range of varying loads and speeds. A centrifugal pump requires a high torque at high speed and a low torque at low speed. A squirrel cage synchronous motor provides a highly desirable torque versus speed characteristic. However, such motors generally are constructed to operate at a given synchronous speed and variations in excess of ten percent of such synchronous speed normally result in damaging heating effects. Although multi-winding polyphase motors are available, they provide only two to four different speeds and are not particularly suitable for a continuously varying flow or speed control. Applicant has realized that the recently developed high temperature synchronous motors for controlled rectifiers control circuits provide a means for operating a synchronous motor at speeds different than synchronous without damaging of the motor if the heating effect of the solid state control system is eliminated.

In accordance with the teaching of the present invention, a centrifugal pump or the like is driven by a high temperature synchronous motor which is interconnected to the incoming power supply through a variable transformer. The centrifugal pump may form a part of a flow system requiring widely varying flows and loads. The speed of the motor is, of course, directly proportional to the amplitude of the applied voltage. Therefore, by varying the setting of the transformer, the speed of the motor is varied with respect to the synchronous speed. The transformer provides an essentially faithful reproduction of the incoming alternating current sine wave. As a result, there is a very minimal amount of heating as a result of the variable speed power applied to the motor. Consequently, the heating effect resulting from operating at other than synchronous speeds will not result in damaging of the motor. This system has a very distinct advantage of providing a variable speed motor suitable for driving of a centrifugal pump and other similar loads while minimizing the cost. Thus, by employing a variable autotransformer, the motor control system can be readily constructed at approximately one-half the cost of the solid state control systems. Further, the system is readily adapted to a servo or feedback system having means for automatically positioning the autotransformer for either constant pressure or constant flow.

In a preferred and novel construction, a pneumatic spring-return actuator was interconnected to an autotransformer. The actuator was connected to an air supply through an error sensor supplying and exhausting air with respect to the pneumatic actuator. A transfer member is held between a line pressure actuated diaphragm and a reference pressure actuated diaphragm and coupled to the 3-way valve to vary the air supply to the pneumatic actuator.

The actuator in turn positions the autotransformer to vary the speed of the centrifugal pump until the flow pressure sensed by the flow sensing diaphragm balances the reference pressure to establish a stable operating point. As the servosystem tends to overshoot with a resulting hunting action around the operating point, a means is provided to provide fast response to a large error while essentially avoiding the hunting about the operating point. A particularly novel and reliable system can employ a restriction between the 3-way control valve and the actuator. A check valve system is provided for by-passing of the restriction in the presence of a large error signal. Further, the differential pressure across the orifice is applied to the diaphragm actuating means to anticipate the small error changes and thereby stabilize the operation about the desired operating point.

For constant flow, the system can be modified to sense the pressure drop between a pair of closely spaced points to the output side of the centrifugal pump. This pressure drop is applied to the error sensor to balance the reference pressure. It provides a very simple and inexpensive means of providing a constant pressure or constant flow scheme or system.

Applicant has found that the above system resulted in extremely accurate pressure control as a result of the interaction of the error sensor construction and the capability and operation of the transformer.

The present invention has thus provided a highly practical flow control system which is particularly adapted for use where sanitary requirements are strict and where high degrees of accuracy and long service life are required with a very minimum of cost.

The drawing furnished herewith illustrates the best mode presently contemplated by the inventor for carrying out the subject matter of this invention and clearly discloses the above advantages and features as well as others which will be readily understood by those skilled in the art from the following description.

In the drawing:

FIG. 1 is a schematic illustration of a constant pressure flow system in accordance with the teaching of the present invention;

FIG. 2 is a graphical illustration of pump and motor characteristics for a pump and motor shown in FIG. 1;

FIG. 3 is an enlarged vertical section through an error sensor unit or means shown in FIG. 1; and FIG. 4 is a partial schematic diagram of a feedback system similar to that shown in FIG. 1 and modified to provide a constant flow system.

Referring to the drawing and particularly to FIG. 1, the present invention is shown applied to a flow system having a flow line 1 within which a centrifugal pump 2 is secured to establish flow from left to right in the drawing. A three-phase special squirrel cage motor 3 is connected to drive the centrifugal pump 2. In accordance with the present invention, the motor 3 is interconnected to a set of three-phase power lines 4 by an autotransformer 5. The motor 3 in particular includes a stator 6 interconnected to the output or secondary side of the autotransformer 5. A squirrel cage rotor 7 is mounted within the stator 6 and interconnected to the pump 2. The motor 3 is a polyphase synchronous induction motor which normally is selected to operate at a desired synchronous speed. If the motor is operated at some other speed, heating loss tends to rise directly in accordance with the variation or the amount of the variation from synchronous speed. As previously noted, special high temperature motors designed for solid state chopped wave controls are available from a number of manufacturers. For example, General Electric Company and the Delco Division of General Motors manufacture and sell open, fan cooled motors of this type. Further, applicant has found a highly satisfactory high temperature totally enclosed motor manufactured and sold by the Brook Motor Corporation of Great Britain, for SCR full wave control adjustable speed variable torque motor. Actual tests on such a motor resulted in a torque versus speed characteristic line for a constant motor temperature approaching the maximum temperature rating of the insulation. For example, a 15 H.P., 3300 r.p.m. Brook motor was coupled to drive 216 centrifugal pump with a 6 inch impeller and was controlled by a T500U, 50 amp. "Staco" autotransformer having a full voltage of 235 volts. It is assumed that the motor is governed solely by temperature rating of the insulating in accordance with customary commercial practice. The line 8 in FIG. 2 thus indicates the maximum operating point for the winding and therefore the motor 3. The temperature line 8 is superimposed in FIG. 2 upon a series of pressure versus flow at constant speed lines 9 for the centrifugal pump 2 employed with the motor 3. The superimposed plots provide an indication of satisfactory operating points. Thus, continuous operation at any point within the illustration to the left of the temperature curve on line 8 is permitted. This area to the left of line 8 provides a substantial and commercially practical operating range. Intermittent or short term operation is permitted to the right of the line 8 without damaging the motor 3.

The autotransformer 5 includes a three-phase winding 10 interconnected to the three-phase power lines 4. Although not shown, suitable on-off control switching can, of course, be provided in the power line connections. Suitable continuously variable taps 11 are provided on each phase of the three-phase windings 10. The taps 11 are ganged as diagramatically shown and interconnected to piston-cylinder type actuator 12 which forms a part of a servo system for providing a simple and reliable feedback control.

The illustrated actuator 12 includes a spring-return loaded piston 13 which is pneumatically driven. An air line 14 is connected to the actuator 12 to position the piston against the bias of a return spring in accordance with the applied pressure.

The output of the illustrated actuator is a reciprocating motion. Generally, the autotransformer 5 may include a rotary type adjustable tap. A suitable reciprocating to rotary motion converter such as a fall screw device may then interconnect the piston 13 to the taps 11. As such constructions are well known and may take any one of a number of constructions, it is diagrammatically shown in FIG. 1.

The pressure at the air line 14 is controlled by an error sensor 15 connected in line 1 which, as presently described, is a valve means controlling the interconnection of the air line 14 to an air supply 16.

Referring particularly to FIG. 3, a cross-section of a highly satisfactory error sensor 15 is illustrated. Generally, the sensor includes a 3-way valve 17 mounted within a housing 18. A mounting hub is provided on the lower end of the housing 18 and is secured to a stub pipe 19 on line 1 by a suitable clamp 20. A pressure sensing diaphragm 21 is disposed between the housing 18 and the stub pipe 19 to seal the pipe and provide a product pressure sensing means which is interconnected to the 3-way valve 17. A valve coupling member or block 22 is disposed between the product sensing pressure diaphragm 21 and a reference pressure diaphragm 23 forming a part of a multiple diaphragm wafer assembly 24. A plurality of mounting bolts 25 extend through the outer portion of the wafer assembly 24 and secure it to the base of the housing 18.

The lower wafer or member 26 of the assembly 24 is generally an annular ring member aligned with lower opening of the housing 18 and the pipe stub 19. A second wafer or member 27 of assembly 24 is secured in stacked relation upon the lower member 26 with the reference diaphragm 23 clamped therebetween. The underside of the member 27 includes a recess which in cooperation with the diaphragm 23 defines a reference cavity 28. A reference pressure line 29 is connected to the cavity 28 as shown in FIG. 1, through an adjustable pressure regulator 30, the reference pressure applied to the diaphragm 23 is controlled. The amount of this pressure can be visually indicated by a suitable pressure gauge 31 if desired.

The coupling block 22 which is disposed immediately between the diaphragms 21 and 23 is therefore positioned in accordance with the relative positioning of the diaphragms. If the pressure in the reference pressure cavity 28 is increased relative to the line pressure, the diaphragm will move downwardly as viewed in FIG. 3 and cause the block 22 to move downwardly. Conversely, relatively decreasing the pressure in cavity 28 results in a reverse movement of the coupling block. This movement is interconnected to the control valve 17.

The control valve 17 includes a housing 32, the lower end of which is secured to a mounting head 33, integrally formed on the top of the wafer assembly 24, by suitable bolts 34. A vertical valve opening 35 extends through the housing with an air supply port 36 connected to supply 16 and an exhaust port 37, vented to atmosphere, in vertically spaced relation along the one side of the housing 32. An outlet port 38 is provided on the diametrically opposite side of the housing generally intermediate of the position of the supply port 36 and the exhaust port 37. A valve spool 39 is slidably mounted within the valve opening 35 to selectively interconnect the supply port 36 and/or the exhaust port 37 to the outlet port 38 and to thereby control the pressure to actuator 12.

The spool 39 is connected to the upper portion of a rectangular yoke 40 which encircles the valve 17 and extends downwardly. The bottom cross member or leg 41 extending through similar openings 42 in the lower wafer 26 of the wafer assembly 24. The bottom leg 41 also extends through a close fitted opening 42a in the coupling block 22 such that the yoke is supported by and moves with the block 22.

The operation of the system as described above may be summarized as follows. The reference pressure to cavity 28 is preset by the operator through adjustment of the pressure regulator 30. The product pressure in the line acts on the diaphragm 21. This pressure is transmitted to the coupling block 22 and is balanced by the reference pressure applied to the diaphragm 23. The coupling block 22 is positioned in accordance with the difference or the relative pressures applied to the diaphragms 21 and 23, and correspondingly positions the yoke 40. If the system is not in balance, the movement of the yoke 40 is transmitted to the 3-way control valve 17 to vary the position of the spool 39 and charge the connection of port 38 to the air supply port 36 and the exhaust port 37. For example, if product pressure is below the desired level, the yoke 40 and spool 39 will move downwardly to open the port 36 and increase air flow from the air supply 16 to the actuator 12. The piston 13 of the actuator 12 moves outwardly against the bias of the return spring. The construction is such that this movement of the actuator 12 positions the taps 11 to increase the output voltage of the transformer 5. The higher voltage applied to the special squirrel cage synchronous motor 3 causes it and the inter-connected centrifugal pump 2 to increase in speed with resulting increase in product pressure.

If the product pressure is too high, the coupling block 22 and the yoke 40 are forced upwardly with a reverse action. Thus, the three-way valve spool 39 would move upwardly tending to cut off the air supply to the actuator 12 and exhausting air from the actuator 12. This allows the retraction of the piston 13 and the reverse positioning of the taps 11 and the autotransformer 5.

As servosystems such as they illustrated cannot provide instantaneous response, the actuator 12 will tend to overrun in response to any required correction because of the delay between the establishment of an error signal and the establishment of a motor and pump equilibrium speed. The outlet port 38 is connected to line 14 through a special pressure stabilizing unit 43. The stabilizing control pressure unit 43 of the present invention provides a means for preventing the overshooting effect by modifying the action of the assmbly 24 as follows.

The stabilizing control pressure unit 43 includes a variable orifice 44 connected in series with the output port 38 to the line 14. A pair of signal lines 45 and 46 are interconnected to the opposite sides of the orifice 44 and to the diaphragm actuating wafer assembly 24.

The assembly 24 includes a diaphragm clamped between the second wafer element 27 and a third wafer or member 48. Element 27 is recessed adjacent the diaphragm 47 to define a chamber or cavity 49. The line 45 is connected to the cavity 49 and applies a corresponding pressure to the diaphragm 47. A coupling block 50 is disposed within the member 48 between the diaphragm 47 and a further control diaphragm 51. A top wafer or member 52 of the assembly 24 is secured in stacked relation on top of the diaphragm 51 and provided with a recess to define a further chamber or cavity 53. Line 46 is connected to the cavity 53 to apply a corresponding pressure to the top diaphragm 51 thereby providing a force tending to move the coupling block 50 in the opposite direction from that of the diaphragm 47. A cross arm 54 of the yoke 40 extends through suitably large openings 55 in the wafer 48 and a close fitting opening 56 in the block 50. The positioning of the block 50 provides a secondary positioning of the yoke 40 and spool 39 in accordance with the differential pressure appearing across the lines 45 and 46. The orifice 44 of the stabilizing control unit 43 is adjustable as shown by the arrow 57, and connected in series with the output port 38 to a connection 58 for line 14. The control pressure stabilizing control unit 43 is formed in an integral housing portion 59 of the control valve housing 32 with the air supply passageway extending laterally therethrough. A first perpendicular passageway 60 is formed in the housing portion 59 between the outlet port 38 and the orifice 44. The lower end of the passageway 60 is connected to the line 45 and applies a corresponding pressure to the chamber or cavity 49. A spring load check valve 61 closes the opposite end of the passageway 60. The illustrated check valve includes a valve ball 62 which is biased against a seat formed in the passageway by a small spring 63. The spring and ball are held in position by a suitable adjustment screw 64 which can vary the tension of the spring 63 and thereby the pressure level of the valve ball 62. A lateral by-pass passageway 65 is formed in the housing portion 59 immediately outwardly of the valve seat and interconnects the passageway 60 with a similar perpendicular passageway 66 between the orifice 44 and the connection 58 to line 14.

The one end of the passageway 66 is connected to the line 46 and thereby to the modifying or stabilizing diaphragm cavity 53. The opposite end of passageway 66 is closed by a check valve 67 which is constructed in the same manner as valve 61. A by-pass passageway 68 interconnects the passageway 66 to the passageway 60 to the output side of the check valve 67.

In operation, a flow of air from the air supply 16 to the actuator 12 will establish a pressure in the passageway 60 which is greater than the pressure in the passageway 66. The differential pressure is related to the amount of flow and the setting of the variable orifice 44. With a greater pressure at passageway 60 and therefore line 45, the diaphragm 47 will tend to raise and move the coupling block 50 upwardly. This will tend to raise the yoke 40 a corresponding amount in the same manner as an actual increase in product pressure. Consequently, when the spool 39 is set to supply air to actuator 12 and raise the product pressure, the spool 39 is moved an excess amount by this differential of pressure and will actually terminate the flow of control air before the total correction has occurred. Functionally, it anticipates the cut-off point and opposes the overshooting effect to stabilize the system.

Similarly, when the spool 39 has been actuated to cut off the air supply and exhaust air from the actuator 12 to the exhaust port 37, a greater pressure will appear in passageway 66 with respect to passageway 60. The differential pressure applied to lines 45 and 46 is therefore in opposite direction and causes the spool 39 to move downwardly an excess amount and correspondingly anticipate the cut-off point.

The variable orifice 44 acts as a throttle and interferes or retards the response of the system in response to a large demand change. Response of this system is increased by the use of the pressure operator check valves 61 and 67. If a large pressure increase is demanded, a substantially higher pressure appears in the passageway 60. This pressure opens the check valve 61 and flow is thereby shunted about the orifice 44 and applied directly to the line 14. The valve 61 will remain open until such time as the difference between the product pressure and the reference pressure is relatively small at which time the stabilizing effect, as described above, will again occur. The same action occurs if the demand is in the opposite direction; that is, the reference pressure is substantially larger than the product pressure. In such a case the pressure of line 14 is substantially larger than the exhaust pressure and the check valve 67 opens to by-pass the line 14 directly to the passageway 60.

The spool valve 17 is constructed in a manner to provide a friction-free spool movement with a minimum amount of travel. This provides high accuracy, and long life.

The flexible diaphragms having essentially the same area exposed to the respective pressures. This provides a high degree of accuracy in the comparison of the product and reference pressures. The friction effects are essentially eliminated in the assembly 24 by providing clearance about the coupling blocks and the guide cavities as well as providing sufficient clearance between the coupling arms of the yoke and the through openings in the elements of the wafer assembly.

The several elements including the spool, yoke interconnecting rods and blocks and the like may introduce a slight fixed error into the sensor unit. If desired, the assembly can be balanced by the use of a suitable spring. However, such additional expense and construction would only appear to be necessary where the reference pressure is to be critically equal to the product pressure. For most practical applications, this high degree of accuracy is not required.

The operation of the illustrated embodiment of the invention may be summarized as follows.

The pressure regulator 30 is adjusted to provide a desired reference pressure related to a preselected flow pressure. The error sensor 15 compares the set pressure with the actual line pressure. As long as line pressure is below the set level, the coupling to the diaphragm moves the spool 39 downwardly to supply air to and through the three-way valve 17 to the piston actuator 12. This results in a movement of the taps 11 of autotransformer 5 to increase the voltage applied to the stator 6 of the motor 3. The motor 3 will operate at an increased speed and thereby increase the speed of the centrifugal pump 2 to continuously raise the output pressure. Initially, and in response to a large step change, the air pressure is by-passed through the check valve 61 directly to the line 14. As the pressure error is reduced to a small amount, the check valve 61 closes and provides the modifying control pressure to the auxiliary stabilizing diaphragms 47 and 51 via lines 45 and 46 to thereby anticipate and cut off the air supply slightly before the balance position. This will essentially eliminate or minimize overshoot.

If the applied pressure becomes too high, the control is in the opposite direction.

The stabilizing connection minimizes any overshooting about the equilibrium point and provides reliable and stable operation at the set point.

A system constructed in accordance with the present invention has been found to provide a highly stable and reliable response. Line pressures were varied and repeated within .02 pound per sq. inch in a range of pressures in excess of 100 lbs. per sq. inch and flows up to 200 gallons per minute. The synchronous motor 3 operating from the autotransformer 5 thus provides a relatively inexpensive and reliable means for driving of a centrifugal pump and the like. The voltage which is essentially a true sine wave applied to the special temperature operating synchronous motor to vary the speed from the synchronous speed provides a very convenient means of controlling the torque characteristic in accordance with the torque requirements of a centrifugal pump and the like. Consequently, this permits the use of an inexpensive and reliable motor and input control.

Although described in connection with a constant pressure system, the system is readily adapted to provision and maintaining a constant flow, for example as shown in FIG. 4. In FIG. 4 a pressure sensor 69 is interconnected downstream of the error sensor. In the illustrated embodiment of the invention, a venturi section 70 is interconnected in the flow line 1 downstream of the error sensor. The pressure sensor 69 is connected to the venturi 70 in accordance with known connections. An air supply line 71 is shown connected between the air supply 16 and the pressure sensor 69. The pressure sensor may be a diaphragm sensitive device which selectively interconnects the air supply line 71 to a feedback line 72 and to an exhaust 73. The feedback line 72 interconnected to the error sensor to provide a positioning thereof in accordance with the pressure difference at the points of the error sensor 15 and the venturi 70. The pressure differential is directly related to the flow regardless of the pressure within the line 1 and thereby permit adjustment of the three-way valve accordingly. For example, a further diaphragm, not shown, may be inserted in the assembly 24 of sensor 15 and connected to oppose the movement of the line pressure at sensor 15.

This feedback permits the flow to be controlled to any desired level by controlling the set pressure, with the overall operation of the system corresponding to that of the constant pressure system as heretofore described.

There will be a direct relationship between the equilibrium flow and the set pressure. A flow indicating gauge 74 can then be substituted for the pressure reading gauge 31 of the previous embodiment. The gauge 74 is a pressure gauge calibrated to provide a direct read-out of flow rates. The gauge reads the set pressure and indicates only the equilibrium flow and not the flow at any given instant. If the instantaneous flow is to be indicated, additional sensing devices may be added to the error sensor or the like.

The present invention has thus provided a simple, reliable and inexpensive liquid pumping system.

I claim:

1. A liquid pumping system at different flow pressures, comprising a pump means adapted to be connected in said line, and operable over a wide range of pressures and loads, an electric induction motor having a stator and a squirrel cage rotor connected to drive said pump, said motor operating with a maximum safe operating temperature over a wide range of different speeds and torques, a transformer having an adjustable means to vary the amplitude of the output voltage, means connecting said transformer to said stator to energize said motor for variable speed operation and drive said pump in accordance with the amplitude of the output voltage.

2. The liquid pumping system of claim 1 wherein said pump means is a centrifugal pump.

3. The pumping system of claim 1 wherein said motor is a three phase squirrel-cage induction motor and said transformer is a three-phase transformer.

4. The pumping system of claim 1 wherein said motor is a three-phase motor and said transformer is a three phase autotransformer.

5. The pumping system of claim 1 having an error sensing means connected to actuate said transformer to establish and maintain a constant output pressure or flow in said lines.

6. The pumping system of claim 1 having a fluid actuator coupled to said adjustable means of said autotransformer, a fluid source, a valve means connected between said fluid source and said actuator, an operator connected to said valve means and to said line and responsive to the line pressure to position said valve means.

7. The pumping system of claim 1 having a fluid actuator coupled to said adjustable means of said autotransformer, a fluid source, a valve means connected between said fluid source and said actuator, a diaphragm operator connected to said line and responsive to the line pressure, means connecting said diaphragm operator to said valve means.

8. The pumping system of claim 1 having a fluid actuator, a fluid source, a valve means connected between said fluid source and said actuator, a diaphragm operator and having a first diaphragm subjected to line pressure and second diaphragm subjected to reference pressure, a transfer means coupled to said two diaphragms and connected to said valve means, orifice means connected between the valve means and the actuator, and means to sense the pressure differential across said orifice and to actuate the valve means to stabilize the operating point of said valve means.

9. The pumping system of claim 1 having a pneumatic piston actuator coupled to said adjustable means of said autotransformer, a valve means having an air inlet means and adapted to be connected to a source of air and an air outlet means connected to said actuator and an air exhaust means, a diaphragm operator and having a first diaphragm subjected to line pressure and second diaphragm subjected to reference pressure, a transfer disposed between said two diaphragms and connected to said valve means, orifice means connected between the valve means and the actuator, pressure responsive means to by-pass said orifice means, and means to sense the pressure differential across said orifice and to actuate the valve means to stabilize the operating point of said valve means.

10. The liquid pumping system of claim 1 wherein said pump means is a centrifugal pump and said motor is a three phase squirrel cage induction motor connected to drive said pump, said autotransformer is a three-phase transformer having said adjustable means connected to correspondingly vary the amplitude of each output phase voltage, a pneumatic actuator coupled to said adjustable means of said autotransformer, a three-way spool valve means for connecting an air supply to said actuator and to an exhaust means, a pressure operator having a preset pressure means and sensing means to sense the line pressure and establish an output in accordance with the pressures of the preset pressure means and the sensing means, and means to sense the rate of change of movement of the air to and from said actuator and to actuate said spool valve means to anticipate said line condition.

11. The pumping system of claim 10 wherein said operator is multiple diaphragm unit having a first diaphragm subjected to line pressure and second diaphragm subjected to reference pressure, a transfer means disposed between said two diaphragms and connected to said valve means, orifice means connected between the valve means and the actuator, a third diaphragm connected to one side of said orifice, a fourth diaphragm connected to sense the pressure to the opposite side of the orifice, and means disposed between said third and fourth diaphragms and connected to the valve means to actuate the spool valve means.

References Cited

UNITED STATES PATENTS

| | | | |
|---|---|---|---|
| 729,199 | 5/1903 | Meyer. | |
| 1,411,145 | 3/1922 | Whitted | 103—35 |
| 2,469,294 | 5/1949 | Dawson. | |
| 2,844,773 | 7/1958 | Turner et al. | |
| 2,938,536 | 5/1960 | Ehrenberg | 103—11 |
| 2,950,682 | 8/1960 | Kimmel | 103—35 |
| 3,123,005 | 3/1964 | Bredehoeft et al. | 103—35 |
| 3,125,856 | 3/1964 | Bronson et al. | 103—41 |
| 3,393,642 | 7/1968 | Kordik et al. | 103—35 |
| 3,439,622 | 5/1969 | Welty et al. | 103—35 |

HENRY F. RADUAZO, Primary Examiner

UNITED STATES PATENT OFFICE
CERTIFICATE OF CORRECTION

Patent No. 3,551,072     Dated December 29, 1970

Inventor(s) ROBERT D. ZIMMERLY

It is certified that error appears in the above-identified patent and that said Letters Patent are hereby corrected as shown below:

Column 4, Line 3, (Page 6, Line 24)    Cancel "on" and substitute --- or ---.

Signed and sealed this 27th day of April 1971.

(SEAL)
Attest:

EDWARD M. FLETCHER, JR.
Attesting Officer

WILLIAM E. SCHUYLER, JR.
Commissioner of Patents